United States Patent
Lee et al.

(10) Patent No.: US 6,507,675 B1
(45) Date of Patent: Jan. 14, 2003

(54) STRUCTURE-GUIDED AUTOMATIC LEARNING FOR IMAGE FEATURE ENHANCEMENT

(75) Inventors: Shih-Jong J. Lee, 15418 SE. 53rd Pl., Bellevue, WA (US) 98006; Seho Oh, Mukilteo, WA (US); Chi-Chou Huang, Redmond, WA (US)

(73) Assignee: Shih-Jong J. Lee, Bellevue, WA (US)

( * ) Notice: Subject to any disclaimer, the term of this patent is extended or adjusted under 35 U.S.C. 154(b) by 40 days.

(21) Appl. No.: 09/815,466

(22) Filed: Mar. 23, 2001

(51) Int. Cl.$^7$ ................................. G06K 9/40
(52) U.S. Cl. ........................ 382/266; 382/155
(58) Field of Search ................ 382/266–269, 382/155–161

(56) References Cited

U.S. PATENT DOCUMENTS

| | | | |
|---|---|---|---|
| 5,295,197 A | * 3/1994 | Takenaga et al. | 382/158 |
| 5,315,700 A | 5/1994 | Johnston et al. | |
| 5,329,596 A | * 7/1994 | Sakou et al. | 382/159 |
| 5,742,504 A | * 4/1998 | Meyer et al. | 700/181 |
| 5,969,753 A | * 10/1999 | Robinson | 348/125 |
| 6,122,397 A | 9/2000 | Lee et al. | |
| 6,130,967 A | 10/2000 | Lee et al. | |
| 6,141,464 A | 10/2000 | Handley | |
| 6,148,099 A | 11/2000 | Lee et al. | |

OTHER PUBLICATIONS

IBM Technical Disclosure Bulletin, Jun. 1994, vol. 37, Issue 6B, pp. 399–402.*
Lee, JSJ, Haralick, RM, Shapiro, LG, "Morphologic Edge Detection", IEEE Trans. Robotics and Automation RA3(2):142–156, 1987.
Serra, J, "Image Analysis and Mathematical Morphology", London:Academic, 1982, pp 318–321.

* cited by examiner

*Primary Examiner*—Thomas D. Lee
*Assistant Examiner*—Stephen Brinich

(57) ABSTRACT

A structure-guided automatic learning system for image feature enhancement uses a learning image together with an application domain structure and detection target specification to produce a feature enhancement image processing recipe. An enhancement goodness measure is used to select between alternatives in the learning process. The feature enhancement recipe is used in an application module to process input images and produce a feature enhanced image output. Calipers are used for application domain structure and detection target specification. To unify the processing steps for all caliper specifications, a non-directional box caliper defined region such as a circle caliper or an arc caliper or other connected structures can be converted into a directional box caliper defined region so that a directional box caliper based feature enhancement method can be applied. The process can be inverted to convert a converted directional box caliper region back to the original format.

24 Claims, 13 Drawing Sheets

Structuring Element A

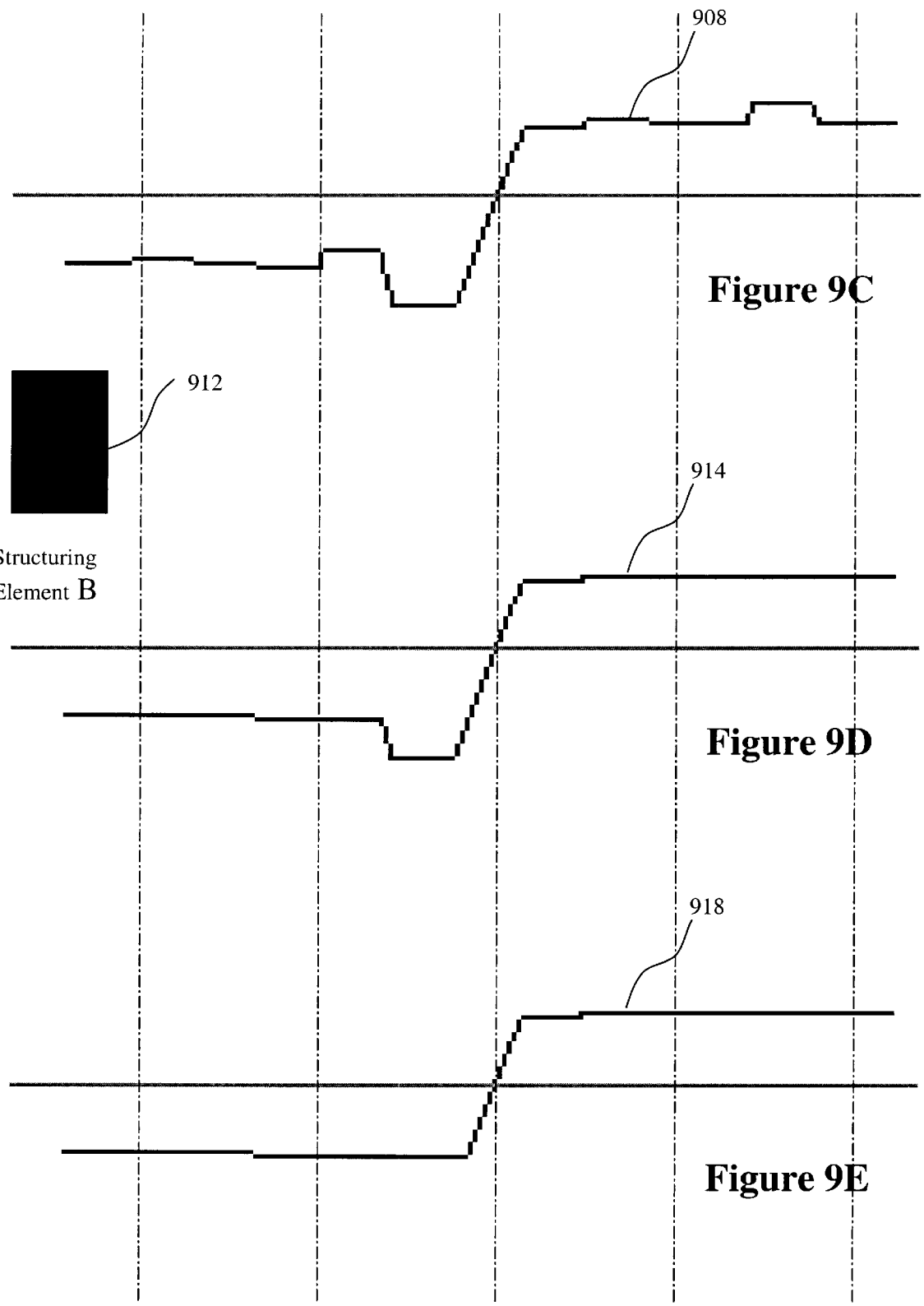

Structuring Element B

STRUCTURE-GUIDED AUTOMATIC LEARNING FOR IMAGE FEATURE ENHANCEMENT

U.S. PATENT REFERENCES

1. U.S. Pat. No. 5,315,700 entitled, "Method and Apparatus for Rapidly Processing Data Sequences", by Johnston et. al., May 24, 1994.
2. U.S. Pat. No. 6,130,967 entitled, "Method and Apparatus for a Reduced Instruction Set Architecture for Multidimensional Image Processing", by Shih-Jong J. Lee, et. al., Oct. 10, 2000.
3. Pending Application Ser. No. 08/888,116 entitled, "Method and Apparatus for Semiconductor Wafer and LCD Inspection Using Multidimensional Image Decomposition and Synthesis", by Shih-Jong J. Lee, et. al., filed Jul. 3, 1997.
4. U.S. Pat. No. 6,122,397 entitled, "Method and Apparatus for Maskless Semiconductor and Liquid Crystal Display Inspection", by Shih-Jong J. Lee, et. al., Sep. 19, 2000.
5. U.S. Pat. No. 6,148,099 entitled, "Method and Apparatus for Incremental Concurrent Learning in Automatic Semiconductor Wafer and Liquid Crystal Display Defect Classification", by Shih-Jong J. Lee et. al., Nov. 14, 2000.
6. U.S. Pat. No. 6,141,464 entitled, "Robust Method for Finding Registration Marker Positions", by Handley; John C, issued Oct. 31, 2000.

CO-PENDING U.S. PATENT APPLICATIONS

1. U.S. patent application Ser. No. 09/693723, "Image Processing System with Enhanced Processing and Memory Management", by Shih-Jong J. Lee et. al., filed Oct. 20, 2000.
2. U.S. patent application Ser. No. 09/693378, "Image Processing Apparatus Using a Cascade of Poly-Point Operations", by Shih-Jong J. Lee, filed Oct. 20, 2000.
3. U.S. patent application Ser. No. 09/692948, "High Speed Image Processing Apparatus Using a Cascade of Elongated Filters Programmed in a Computer", by Shih-Jong J. Lee et. al., filed Oct. 20, 2000.
4. U.S. patent application Ser. No. 09/703018, "Automatic Referencing for Computer Vision Applications", by Shih-Jong J. Lee et. al., filed Oct. 31, 2000.
5. U.S. patent application Ser. No. 09/702629, "Run-Length Based Image Processing Programmed in a Computer", by Shih-Jong J. Lee, filed Oct. 31, 2000.
6. U.S. patent application Ser. No. 09/738846 entitled, "Structure-guided Image Processing and Image Feature Enhancement" by Shih-Jong J. Lee, filed Dec. 15, 2000.
7. U.S. patent application Ser. No. 09/739084 entitled, "Structure Guided Image Measurement Method", by Shih-Jong J. Lee et. al., filed Dec. 14, 2000.
8. U.S. patent application entitled, "Automatic Detection of Alignment or Registration Marks", by Shih-Jong J. Lee et. al., filed Mar. 23, 2001.

REFERENCES

1. Lee, J S J, Haralick, R M and Shapiro, L G, "Morphologic Edge Detection," IEEE Trans. Robotics and Automation RA3(2): 142–56, 1987.
2. Serra, J, "Image analysis and mathematical morphology," London: Academic, 1982, pp 318–321.

TECHNICAL FIELD

This invention relates to image processing methods to automatically learn image feature enhancement processing sequence and parameters.

BACKGROUND OF THE INVENTION

Many computer vision applications require the enhancement and detection of image features for use in classifiers for detecting and classifying objects of interest or to prepare images for measurement operations. Application domain knowledge is available in most of the computer vision applications. The application domain knowledge can often be expressed as structures of image features such as edges, lines and regions, patterning or texture, color, straightness, or fit information (i.e. associated part information). The structures include spatial configurations and relationships of object features such as shape (rectangular, circular and directional, etc.), size, intensity distribution, parallelism, co-linearity, adjacency, intersection angles, etc. The structure information can be well defined in industrial applications such as semiconductor manufacturing, electronic assembly or machine part inspections. In machine part inspections, most of the work-pieces have Computer Aided Design (CAD) data available that specifies its components as entities (LINE, POINT, 3DFACE, 3DPOLYLINE, 3DVERTEX, LINE, POINT, 3DFACE, 3DPOLYLINE, 3DVERTEX, etc.) and blocks of entities. In biomedical or scientific applications, structure information can often be loosely defined. For example, a cell nucleus is round and different cell shapes differentiate different types of biological materials such as blood cells or chromosomes.

A structure-guided processing invention was disclosed in U.S. patent application Ser. No. 09/738846 entitled, "Structure-guided Image Processing and Image Feature Enhancement" by Shih-Jong J. Lee, filed Dec. 15, 2000 that provides a sub-pixel, high performance image feature extraction and enhancement through a structure-guided image processing method which is incorporated in its entirety herein. This US Patent Application teaches how application domain structure information is encoded into the processing sequences and parameters for structure-guided extraction and enhancement of features of interest and removal of noisy and irrelevant information.

In video inspection and measurement applications, objects of different designs are inspected. Image processing sequence and parameters are defined by a designer during the set-up phase for an inspection target. Image processing sequence and parameters have to be updated whenever target designs are changed.

Prior Art

Prior art relies on human experts using a trial and error method to perform the update process. This task is manageable in simple applications where image features have high contrast and low noise and appropriately trained personnel are available. However, in many practical applications, feature contrast and signal to noise ratio are low and the processing results are significantly impacted by even a small change of the processing sequence and/or parameters. For these applications, the human update process is impractical since it is time consuming and the results are not consistent. The resulting system performance depends on the skill and experience level of the human expert. Unfortunately, the availability of skilled human experts is limited and they are often expensive. If the objects to be inspected/measured change frequently, this significantly impacts the productivity, feasibility, and utility of an image inspection/measurement system.

OBJECTS AND ADVANTAGES

It is an object of this invention to reduce the cost to set up or update video measurement or inspection system image processing sequences and/or parameters.

It is an object of this invention to automatically generate an image processing recipe with consistent results.

It is an object of this invention to allow a relatively low skill operator to set-up, maintain, and effectively use an image processing system.

It is an object of this invention to create new applications for video or image measurement and inspection systems. The new applications would adapt easily to frequently changing target specifications.

It is an object of the invention to improve the performance of machine vision systems by easing their effective application.

SUMMARY OF THE INVENTION

One of the limiting factors in the application of image processing technology is the need for skilled personnel to design algorithms that are purpose specific. Current methods produce inconsistent results and are costly and time consuming. This invention provides a method to automatically learn a recipe for image feature enhancement processing sequence and parameters. The learning method of this invention uses data from the application domain structure information and a target detection specification input to produce the image processing recipe and an enhancement goodness measure. An application module uses the image feature enhancement processing sequence and parameter recipe, to process an input image wherein a detection target and application domain structure are indicated using calipers. The application module produces a feature enhanced image output. An enhancement goodness measure is used to evaluate and choose between alternatives in the learning method.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 9D shows the result of another opening operation using structuring element B on the result shown in FIG. 9C to produce a new result.

FIG. 9E shows the result of a closing operation using structuring element B on the result shown in FIG. 9D to produce the final result.

DETAILED DESCRIPTION OF THE INVENTION

Figure 1:
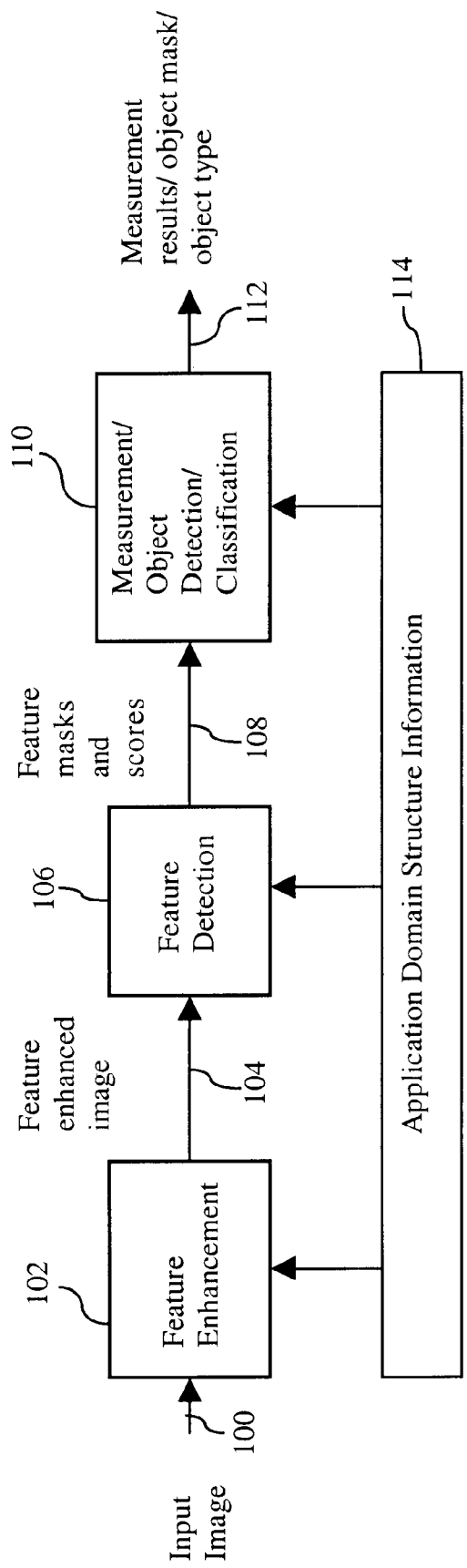
FIG. 1 shows an image measurement/object detection/object classification system.

Many computer vision applications require the enhancement and detection of image features for objects of interest detection, measurement or classification. Application domain knowledge is available in most computer vision applications. The application domain knowledge can often be expressed as structures of image features such as edges, lines and regions. The structures include spatial relationships and configurations between object features such as shape (rectangular, circular and directional, etc.), size, intensity distribution, parallelism, co-linearity, adjacency, intersection angles, etc. The structure information is often already defined in industrial applications such as semiconductor manufacturing, electronic assembly or machine part inspections. In machine part inspections, most of the work-pieces have Computer Aided Design (CAD) data available that specifies its components as entities (LINE, POINT, 3DFACE, 3DPOLYLINE, 3DVERTEX, etc.) and blocks of entities. In biomedical or scientific applications, structure information can often be loosely defined. For example, a cell nucleus is round and different shapes differentiate different types of blood cells or chromosomes.

A structure-guided processing invention was disclosed in U.S. patent application Ser. No. 09/738846 entitled, "Structure-guided Image Processing and Image Feature Enhancement" by Shih-Jong J. Lee, filed Dec. 15, 2000 that teaches sub-pixel high performance image feature extraction and enhancement through a structure-guided image processing method. Application domain structure information is encoded into the parameters for structure-guided feature extraction and enhancement of features of interest and removal of noisy or irrelevant information. In video inspection and measurement applications, objects of different designs are inspected. Image processing sequence and parameters are defined during the teaching phase for an inspection target. Image processing sequence and parameters have to be updated when target designs are changed. Human experts, using a trial and error method, perform the update process. This task may be manageable in simple applications where image features have high contrast and low noise. However, in many practical applications, feature contrast and signal to noise ratio are low and the processing results are significantly impacted by even a small change of the processing sequence and/or parameters. For these applications, the human update process is impractical since it is time consuming and the results are not consistent. The resulting system performance depends on the skill and experience level of the human expert. Unfortunately, the availability of skilled human experts is limited and they are often expensive. This significantly impacts the productivity or the feasibility of an image inspection/measurement system if the objects to be inspected/measured change frequently.

This invention teaches a method to automatically learn image feature enhancement processing sequence and parameters. The learning method of this invention uses data derived from the application domain structure information.

I. Structure-guided Automatic Learning System

FIG. 1 illustrates the processing flow for an application of this invention. It consists of a structure-guided image processing system for image feature measurement, object detection or object classification 110 that receives application domain structure information 114. As shown in FIG. 1, a structure-guided image feature enhancement module 102 processes the input image 100 to enhance image features of interest and remove noise or irrelevant information. The feature-enhanced image 104 is the basis for a feature detection module 106 that detects potential feature masks and/or generates feature scores 108. Feature scores are the strengths/weights/likelihood values of the features of interest for pixels within potential feature masks. Potential feature masks can be generated using the methods disclosed in U.S. patent application Ser. No. 09/738846 entitled, "Structure-guided Image Processing and Image Feature Enhancement" by Shih-Jong J. Lee, filed Dec. 15, 2000 and an embodiment of feature scores are derived from feature extraction processes disclosed therein and incorporated herein.

In another embodiment of this invention, caliper regions are defined by users and the feature scores are determined by a differential method along scan lines of the calipers. Feature masks are determined by thresholding the feature scores. The detected feature masks and scores are used for structure-guided estimation and measurement as disclosed in U.S. patent application Ser. No. 09/739084 entitled, "Structure Guided Image Measurement Method", by Shih-Jong J. Lee et. al., filed Dec. 14, 2000 which is incorporated in its entirety herein. The detected feature masks and scores are also used for object detection and classification. Objects of interest include defects in a semiconductor wafer or machine parts that are inspected by video inspection applications. Application domain structure information derives the parameters for structure-guided feature measurement, structured-guided feature detection and structured-guided measurement/object detection/object classification as shown in FIG. 1.

The invention relates to the feature enhancement module for the image measurement/object detection/object classification system applications as shown in FIG. 1. If the features have low signal to noise ratio, the feature detection and measurement results are incorrect or imprecise. Enhanced image features achieving improved contrast and reduced noise level can be more easily detected and more precisely measured. Therefore, the feature enhancement process is the foundation for an image measurement/defect detection/defect classification system. It is fundamentally important that the feature enhancement processing sequence and parameters are properly designed. This invention provides a method to automatically design the feature enhancement processing sequence and parameters.

Figure 2:
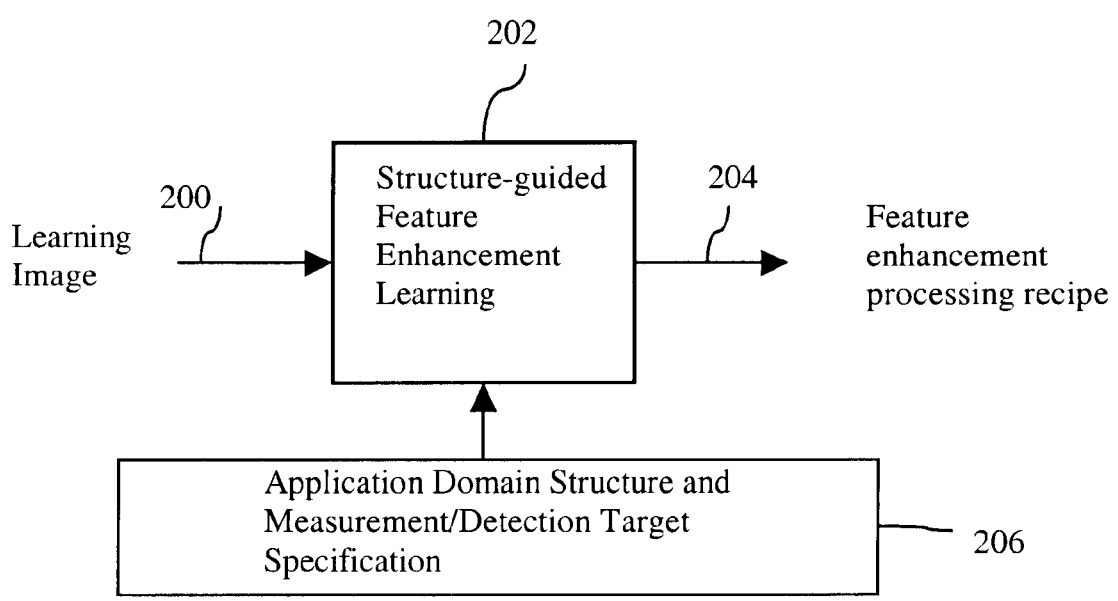
FIG. 2 shows a flow diagram of a structure-guided image feature enhancement learning system.
Figure 3:
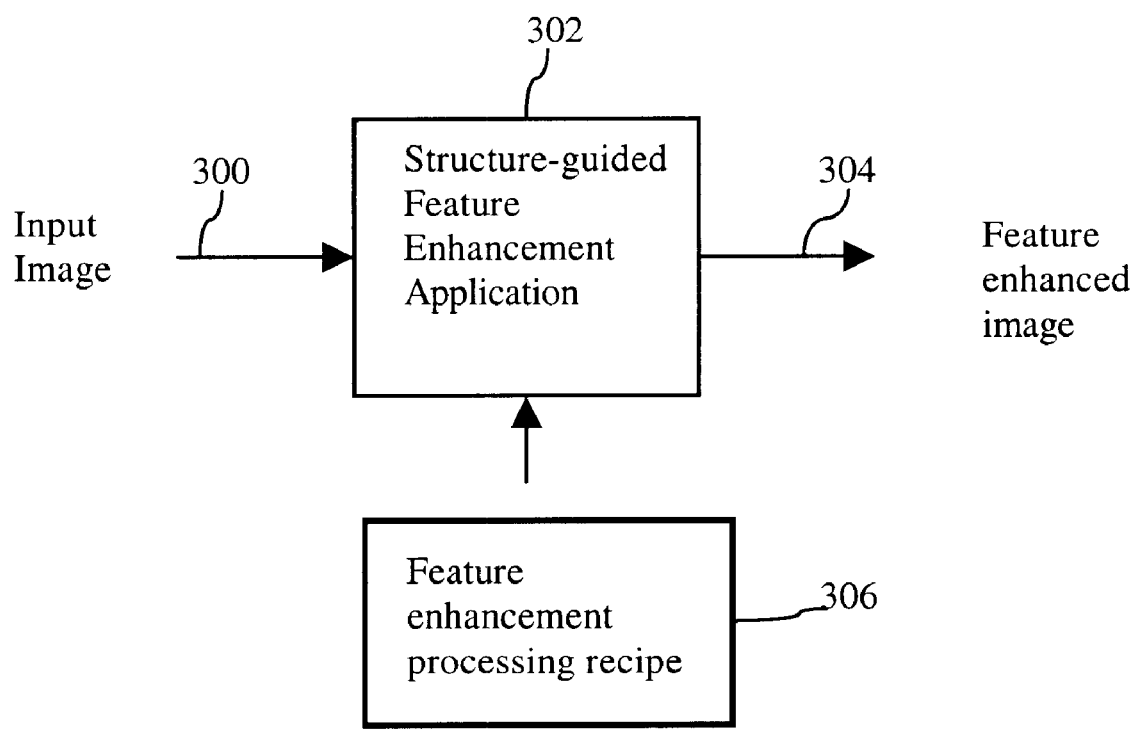
FIG. 3 shows a flow diagram of a structure-guided image feature enhancement application module.

FIG. 2 shows an embodiment of the structure-guided automatic learning invention for image feature enhancement. Application domain structure information and measurement/detection target specification 206 are entered into the learning module. The module automatically generates a feature enhancement processing recipe 204 that includes processing sequence and parameters. In applications, the structure-guided feature enhancement learning 202 only has to be performed once when new inspection targets are defined. As shown in FIG. 3, the processing recipe can be saved and used as input 306 for a structure-guided feature enhancement application module 302 that is used in the application to process new images 300 to produced feature enhanced images 304. The structure-guided feature enhancement application module 302 performs feature enhancement according to the operations and parameters specified in the processing recipe 306.

II. Application Domain Structure and Detection Target Specification

Application domain structure and measurement/detection targets are specified for a measurement/detection task so the image processing sequence can be properly optimized for the task. The amount and extent of the information needed depends on the difficulty of a measurement/inspection task. Simple tasks require only limited structure and target specification. Complicated tasks in low signal to noise ratio applications may require detailed structure information to resolve ambiguity and enhance measurement/detection results. To enhance the usability of an image measurement/inspection system, structure information can be automatically derived from Computer Aided Design (CAD) data or from learning images.

The structure information useful for automatic learning of image feature enhancement process includes features of interest, feature configuration and feature constraints.

Figure 4:
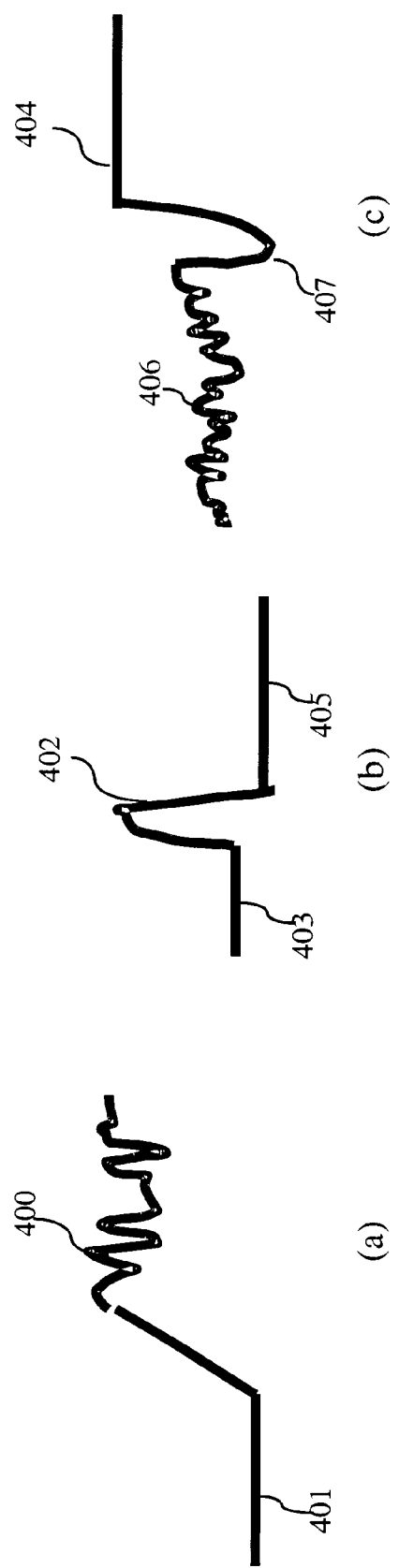
FIG. 4 shows one-dimensional intensity profiles of (a) an edge separates a uniform dark region (left) and a granular bright region (right) (b) a bright line between two uniform regions (c) a dark line between a granular dark region (left) and a uniform bright region (right).

Image boundaries types and image region properties specify target features of interest. Image boundaries separate image regions. Image boundary types include lines or edges. Lines can further be characterized as dark lines or bright lines. Adjacent regions are separated by their boundaries. Region properties reflect the material and geometry of the object surfaces that are imaged by the measurement/detection system. An image region can be classified as uniform, granular, noisy, translucent, patterned, etc. Image region is further characterized as a dark or bright region in gray scale images or by its color or color pattern in color images. FIG. 4 shows one-dimensional profiles of example edge, lines and regions. FIG. 4(a) shows a cross section profile dark region 401 bounded by a bright granular region 400. FIG. 4(b) shows an edge profile of two dark regions 403, 405 separated by a bright line 402. FIG. 4(c) shows a one-dimensional profile of a granular dark region 406 bounded by a bright uniform region 404 with a dark line 407 separating the two regions.

Image feature structure characterizes the geometric configuration of the image features of interest. For example, feature geometric configuration is linear, circular or arc structures or planar, spherical or cylindrical, or pie shaped.

Measurement/detection target specification includes measurement/detection regions along predefined curves (lines, circular arcs), etc. In a preferred embodiment of the invention, the image structure and measurement/detection targets are specified using a caliper approach. Three types of calipers are used: directional box caliper, circle caliper and arc caliper.

II.1 Directional Box Caliper

Figure 5:
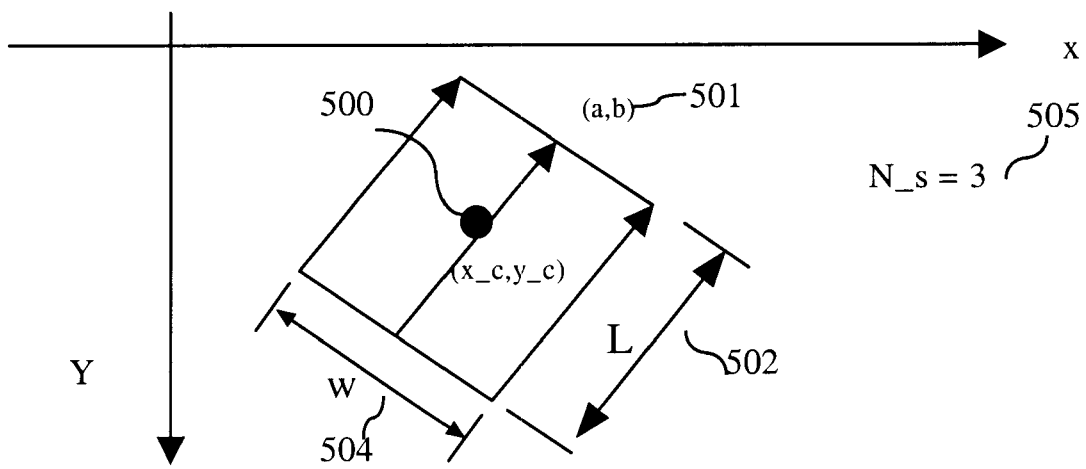
FIG. 5 shows an example of a directional box caliper having 3 scans.

A directional box caliper contains a box along a given direction. FIG. 5 shows an example of a directional box caliper with 3 scans. It can be specified as center (x_c, y_c) 500, direction vector (a, b) 501, length (L) 502 along the box direction and width (w) 504 along the orthogonal direction, and the number of detection scans (N_s) 505 that are equal distance apart. Target feature detection is performed along the detection scans. The direction vector corresponds to lines in the following representation:

$$bx-ay+c=0$$

with the constraint $$a^2+b^2=1$$

The default direction of a box caliper is horizontal. That is, a direction vector of (1,0). A directional box caliper is used to specify linear features of interest to be detected that are oriented generally along a direction orthogonal to the direction of the caliper. The linear features of interest are within the region covered by the box caliper (i.e. within L and W) and their appropriate scale of interest is smaller than the width of the box caliper. Therefore, a large box caliper is used to emphasize large features and a small box caliper is used to highlight small features.

II.2 Circle Caliper

Figure 6:
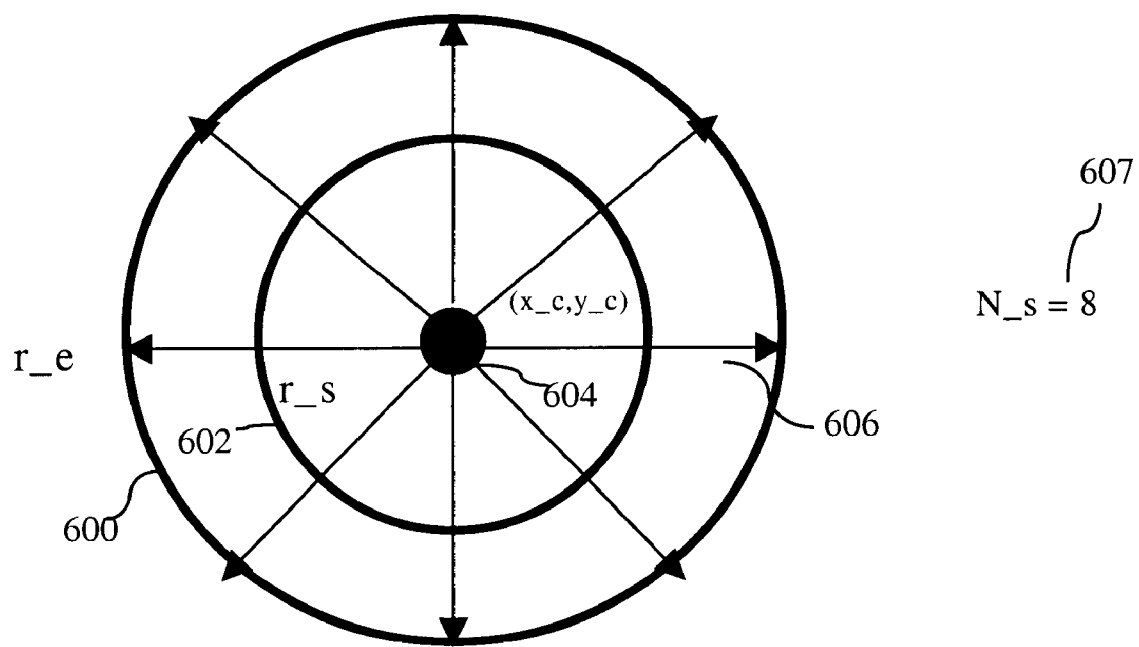
FIG. 6 shows an example of a circle caliper having 8 scans.

A circle caliper consists of multiple detection scans arranged radially. FIG. 6 shows an example of a circle caliper having 8 scans. The radial scans are equal angle apart and oriented outward from the center of the circle. It is specified as a center (x_c, y_c) 604, starting radius (r_s) 602, ending radius (r_e) 600, and the number of radial scans 607. A circle caliper is used to specify circular features of interest that are within the donut-shaped region inside the circle of radius r_e and outside the circle of radius r_s. That is, the circular features of interest should have radius between r_s and r_e. A large circle caliper is used to emphasize large features and a small circle caliper is used to highlight small features.

II.3 Arc Caliper

Figure 7:
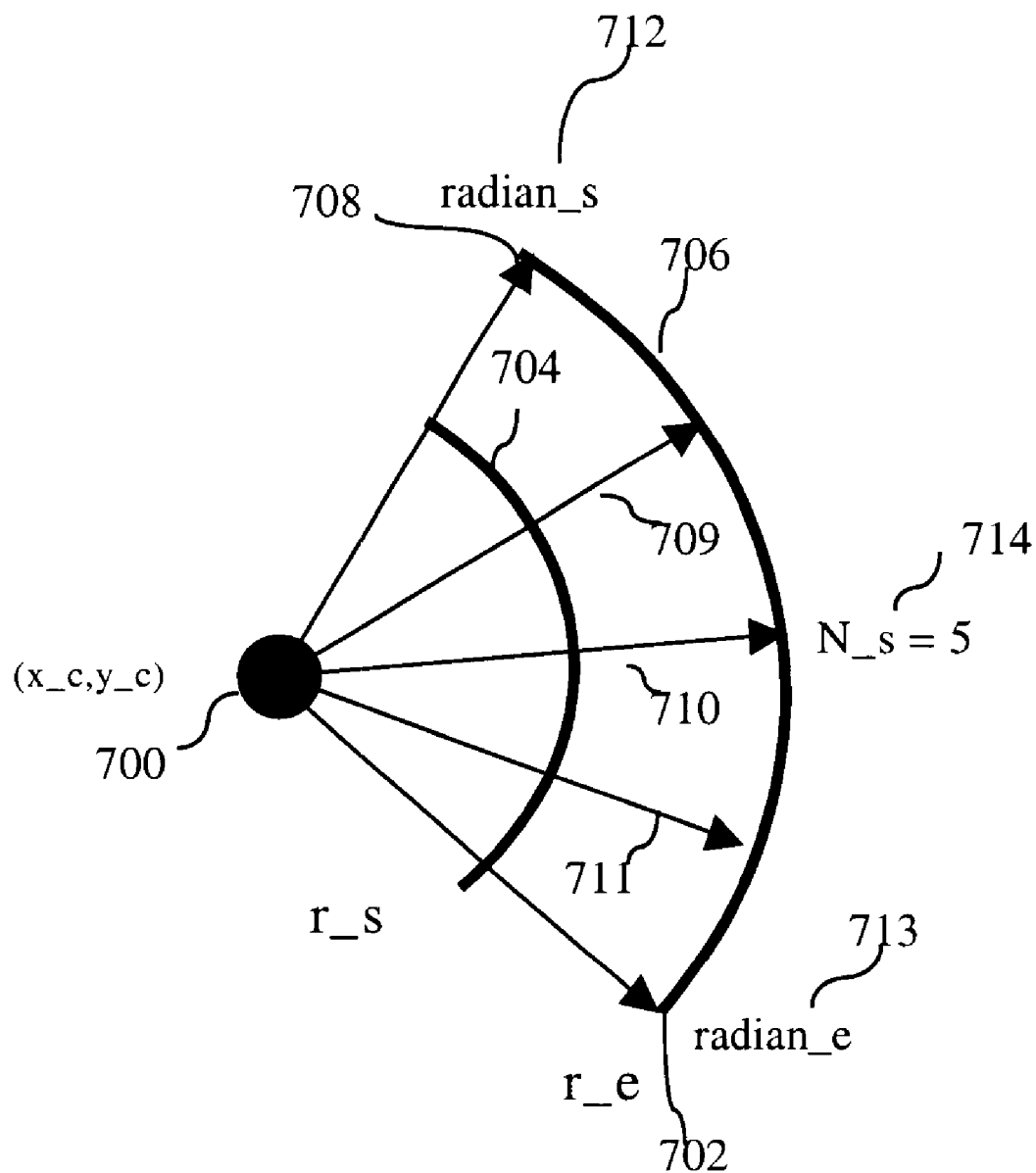
FIG. 7 shows an example of an arc caliper having 5 scans.

An arc caliper is a subset of a circle caliper. FIG. 7 shows an example of an arc caliper having 5 scans. It consists of multiple detection scans arranged radially 708, 702, 709, 710, 711 to form the region enclosed by an arc and the two line segments 708, 702 connecting the center and two end points of the arc (arc region). The radial scans 708, 709, 710, 711, 702 are equal angle apart oriented outward from the center of the arc. The number of scans equals the number of detections or measurements that will be performed. An arc caliper can be specified as center (x_c, y_c) 700, starting radius (r_s) 704, ending radius (r_e) 706, starting angle (radian_s) 712, ending angle (radian_e) 713, and the number of radial scans 714. For convenience, our convention is that the ending angle be greater than the starting angle and the angle increases clock-wise. We define the angle of horizontal axis as 0 radian. An arc caliper specifies arc features of interest that are inside the arc region covered by the center and the arc of radius r_e yet outside the arc region covered by the center and the arc of radius r_s. That is, the arc features of interest should have radius between r_s and r_e. A large arc caliper is used to emphasize large features and a small arc caliper is used to highlight small features.

II.4 Circle Caliper to Directional Box Caliper Conversion and Inverse Conversion To unify the processing steps for all caliper specifications, a non-directional box caliper defined region such as a circle caliper defined region or arc caliper defined region or other connected structure defined region can be converted into a directional box caliper defined region so that a directed box caliper based feature enhancement method can be applied. This increases processing efficiency since most of the common image processing operations are designed for linear memory addressing rather than circular memory addressing. In one embodiment of the invention, the conversion of circle caliper is disclosed herein. Since a circle is isotropic, the direction for the converted box caliper can be arbitrarily selected. In a preferred embodiment of the invention, the horizontal direction (x-axis) is chosen. Other directions of convenience can be selected without impacting the scope of this invention. The conversion steps are listed as follows:

1. Determine the width of the directional box caliper region as w=2π*r_e
2. Determine the length of the directional box caliper region as L=r_e−r_s
3. Determine the value of each point of the converted directional box caliper region by the sequence specified in the following pseudo code:
   For (i=0;i<w; i++)
   {
   line_direction=i/r_e;
   For (j=0; j<1; j++)
   {
   radius=r_s+j/L;
   Determine the pixel P that is closest to the point that is at a radius distance from (x_c, y_c) along line_direction;
   Set the box caliper value at index i and j as: BC[i][j]= pixel value of P;
   }
   }

The above process can be inverted to convert a converted directional box caliper back to the original format that is defined by a circle caliper. The inverse conversion steps are listed as follows:

1. Assume that the width of the converted directional box caliper region is W=2π*r_e.
2. Assume that the length of the converted directional box caliper region is L=r_e−r_s.
3. Assign the value of each point of the directional box caliper region back to the original format defined by the circle caliper by the sequence specified in the following pseudo code:
   For (i=0; i<W; i++)
   {
   line_direction=i/r_e;
   For (j=0; j<L; j++)
   {
   radius=r_s+j/L;
   Determine the pixel P in the circle caliper that is closest to the point that is at a radius distance from (x_c, y_c) along line-direction;
   Assign the pixel value of P as BC[i][j], where BC[i][j] is the value of the box caliper at index i and j;
   }
   }

II.5 Arc Caliper to Directional Box Caliper Conversion and Inverse Conversion

To unify the processing steps for all caliper specifications, a non-directional box caliper defined region such as a circle caliper defined region or an arc caliper defined region or other connected structures can be converted into a directional box caliper defined region so that a directed box caliper based feature enhancement method can be applied. This increases processing efficiency since most of the common image processing operations are designed for linear memory addressing rather than circular arc memory addressing. In an embodiment of the invention, the conversion of an arc caliper is disclosed herein. For convenience, the direction for the converted box caliper is selected as the starting angle (radian_s) in a preferred embodiment of this invention. Other directions such as the horizontal axis can be selected without impacting the essence of the invention. The conversion steps are listed as follows:

1. Determine the width of the directional box caliper region as w=(radian_e−radian_s)*r_e
2. Determine the length of the directional box caliper region as L=r_e−r_s
3. Determine the value of each point of the converted directional box caliper region by the sequence specified in the following pseudo code:
   For (i=0; i<w; i++)
   {
     line_direction=r_s+i/r_e;
     For (j=0; j<1; j++)
     {
       radius=r_s+j/L;
       Determine the pixel P that is closest to the point that is at a radius distance from (x_c, y_c) along line_direction;
       Set the box caliper value at index i and j as: BC[i][j]= pixel value of P;
     }
   }

The above process can be inverted to convert a converted directional box caliper region back to the original format that is defined by an arc caliper. The inverse conversion steps are listed as follows:

1. Assume that the width of the converted directional box caliper region is W=(radian_e−radian_s)*r_e.
2. Assume that the length of the converted directional box caliper region is L=r_e−r_s.
3. Assign the value of each point of the converted directional box caliper region back to the original format defined by the arc caliper by the sequence specified in the following pseudo code:
   For (i=0; i<w; i++)
   {
     line_direction=r_s+i/r_e;
     For (j=0; j<1; j++)
     {
       radius=r_s+j/L;
       Determine the pixel P in the arc caliper that is closest to the point that is at a radius distance from (x_c, y_c) along line_direction;
       Assign the pixel value of P as BC[i][j], where BC[i][j] is the value of the box caliper at index i and j;
     }
   }

Those skilled in the art should recognize that other means for specifying application domain structure and measurement/detection target specification can be used in this invention such as track, ellipse or user specified. Further, the conversion of all caliper specifications into directional box calipers may or may not be required depending on the processing strategy and availability of the different types of image processing operations for a given application.

III Structure-guided Contrast Extraction

For the condition that two regions adjacent to a boundary have different properties, for example if one is a uniform dark region and the other is a granular region, a contrast extraction process is beneficial and can be applied before the process of feature enhancement. This process extracts a contrast difference between two regions. Region contrast is extracted by the difference between grayscale closing "●" and opening "○" to generate a contrast extracted image. The processing sequence is defined as:

$$I●A - I○A$$

Figure 8:
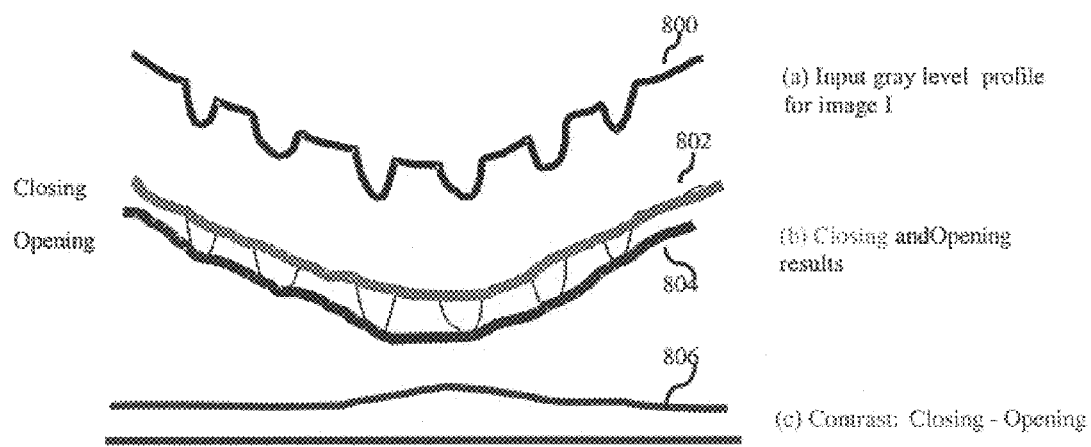
FIG. 8 shows a region contrast extraction example. (a) input grayscale level profile for image I, (b) closing and opening result and (c) contrast extraction result.

FIG. 8 illustrates the difference between a grayscale closing and opening 806 applied to a one-dimensional image profile 800 shown in FIG. 8(a). FIG. 8(b) shows the closing 802 and opening 804 results of image I. The difference of grayscale closing 802 and opening 804 is shown in FIG. 8(c) 806. As can be seen in FIG. 8(c), the morphological region contrast extraction does not introduce any undesired phase shift or blurry effect.

In a preferred embodiment of this invention, the region contrast extraction process uses structuring elements derived from the input caliper specification as follows:

$$I\_contrast = I\_in ● B(w, L/20) - I\_in ○ B(w, L/20)$$

Where B(w, L/20) is a structuring element with width of the smallest odd number greater than or equal to w in the orthogonal direction and length of the smallest odd number greater than or equal to L/20 in the caliper's direction. If either w or L/20 is less than 3, its size will be set to 3.

Those skilled in the art should recognize that other structuring element choices can be used for region contrast extraction.

IV Structure-guided Feature Enhancement Learning

The structure-guided feature enhancement process enhances image features of interest and removes noise and irrelevant information. In one embodiment of this invention, the structure-guided image feature enhancement is accomplished by an increasing idempotent (Serra, J, "Image analysis and mathematical morphology," London: Academic, 1982, pp 318–321) processing sequence such as grayscale morphological opening and closing operations applied alternatively to image foreground and background. Morphological opening and closing operations possess an increasing property that maintains inclusion relationships on the images they are applied to. If an inclusion relationship exists for structuring elements A and B. that is:

$$A \subset B,$$

then combinations of opening, ○, and closing, ●, have the following property $$(((I●A)○A)●B)○B \subset (I●B)○B$$

$$(((I○A)●A)○B)●B \supset (I○B)●B$$

Figures 9A, 9B, 9C:
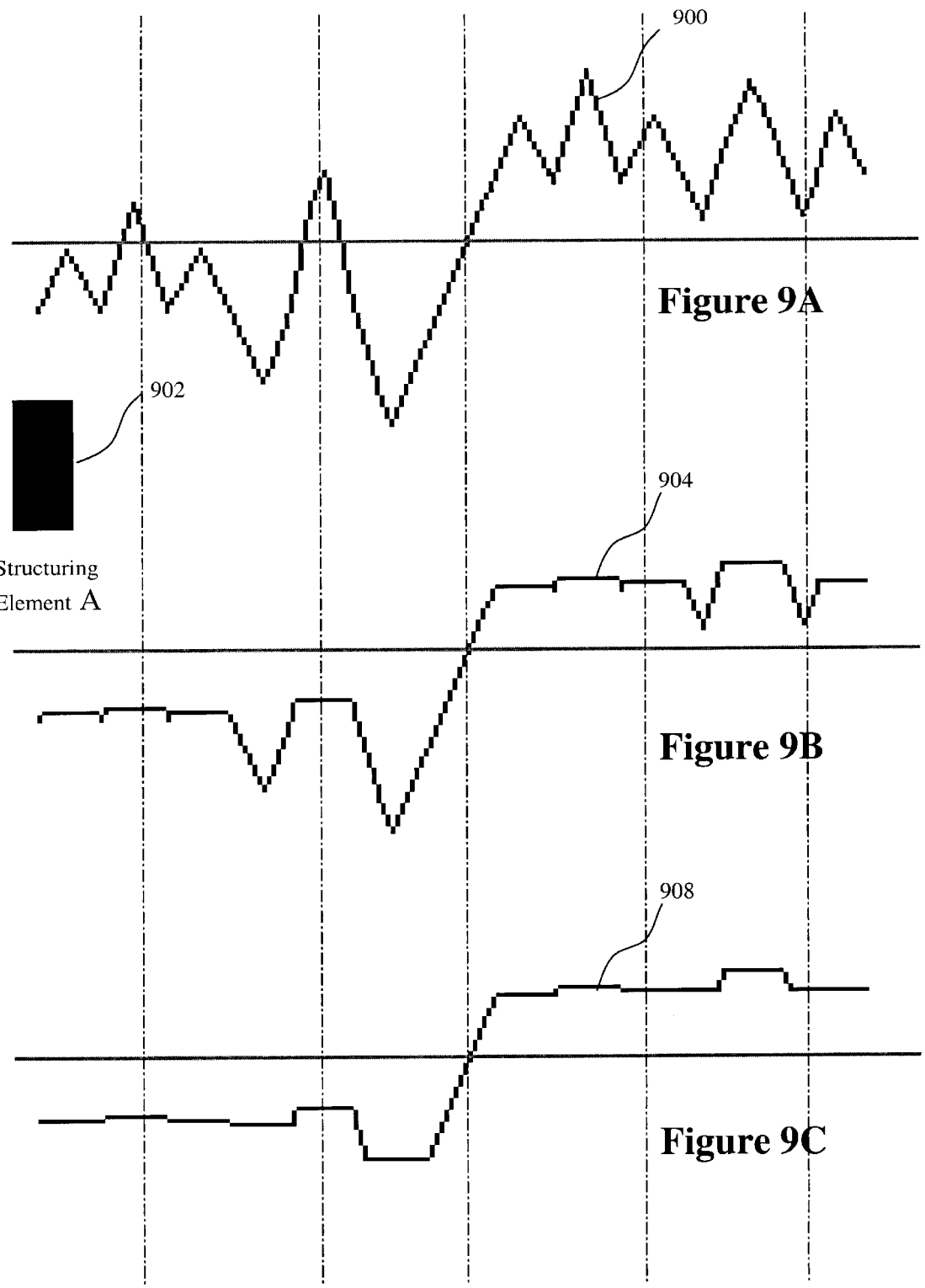
FIG. 9A shows an input noisy edge intensity profile.
FIG. 9B shows the result of opening the noisy input image of 9A using structuring element A.
FIG. 9C shows the result of a closing operation using structuring element A on the result shown in FIG. 9B to produce a new result.
Figures 12A, 12B, 12C:
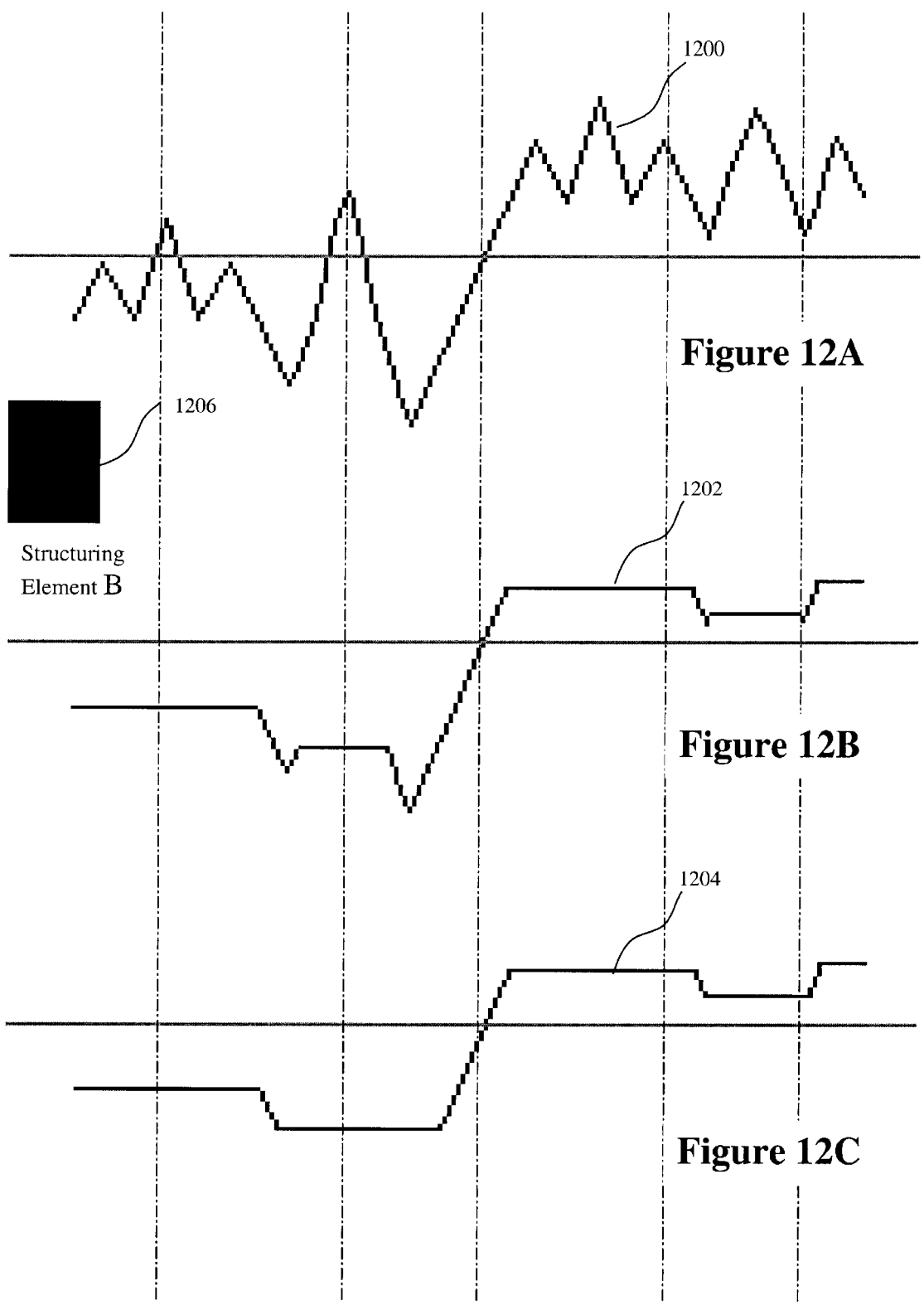
FIG. 12A shows the same input noisy edge intensity profile as FIG. 9A.
FIG. 12B shows the result of opening the noisy input image of 12A using structuring element B.
FIG. 12C shows the result of a closing operation using structuring element B on the result shown in FIG. 12B to produce a new result.

Therefore, processing sequences that progressively apply combinations of openings and closings are less severe and introduce less distortion when a small structuring element is used before a larger one. In a preferred embodiment, application domain structure information encoded by calipers is translated into the size and shape of structuring elements to achieve structure-guided enhancement using increasing idempotent processing sequence. In this invention, the translation process is accomplished automatically through a learning process. FIGS. 9A, 9B, 9C, 9D, 9E illustrate an indempotent structure-guided feature enhancement processing sequence on a noisy edge intensity profile 900. Structuring elements A 902 and B 912 chosen such that A⊂B, are used for the processing. FIG. 9B illustrates the effect of opening using structuring element A 902 producing result 904. FIG. 9C shows the same structuring element A 902 used in a closing operation on the initial result 904 to produce result 908. FIG. 9D illustrates the effect of further opening using structuring element B on result 908 to produce a new result 914. Finally, the structuring element B is applied once again for closing 914 to produce a result 918 shown in FIG. 9E. FIG. 12A repeats the noisy edge intensity profile 900 as 1200. To illustrate the inclusion relationship taught above, the structuring element B was used to open 1200 to produce result 1202 shown in FIG. 12B. The same structuring element B 1206 was then used to open 1202 to produce result 1204 shown in FIG. 12C. The feature enhancement process removes noise and preserves the structure of the features of interest. The feature enhancement process removes noise and preserves the structure of the features of interest up to the desired scale determined by the structuring elements. There is no blur, ringing, overshoot or preshoot normally caused by phase distortion of linear filtering. Processing parameters for the increasing idempotent processing sequence includes starting size of the structuring element, the increment size of the structuring element for each processing iteration and the ending size of the structuring element. The structure-guided feature enhancement process starts with a grayscale opening followed by a Ad grayscale closing or, alternatively, starts with a grayscale closing followed by a grayscale opening. Opening first will enhance dark features and closing first will enhance bright features. The starting operation of the sequence (either opening or closing) is also a processing parameter. Furthermore, the shape of the structuring element such as a disk, box or directional elongated structuring element is also a processing parameter.

By chosing the proper structuring elements, structure-guided feature enhancement can be efficiently accomplished. In the preferred embodiment of this invention, features of different structures and scales are enhanced using directional elongated structuring elements. The direction of the structuring element is chosen to align with the primary direction of the features to be enhanced that are specified by the calipers as well as the direction orthogonal to it. The largest size of the structuring element in the increasing idempotent processing sequence should be smaller than the smallest size of features to be enhanced. One-dimensional directional elongated structuring element can be efficiently implemented (U.S. patent application Ser. No. 09/692948, "High Speed Image Processing Apparatus Using a Cascade of Elongated Filters Programmed in a Computer", by Shih-Jong J. Lee et. al., filed Oct. 20, 2000) and provides a robust result since it has fewer points compared to a disk or box of the same size so it can better tolerate imperfect structure match. Those skilled in the art should recognize that other types of structuring elements can be used in this invention to accomplish feature enhancement.

IV.1 Line Enhancement Learning

Figure 10:
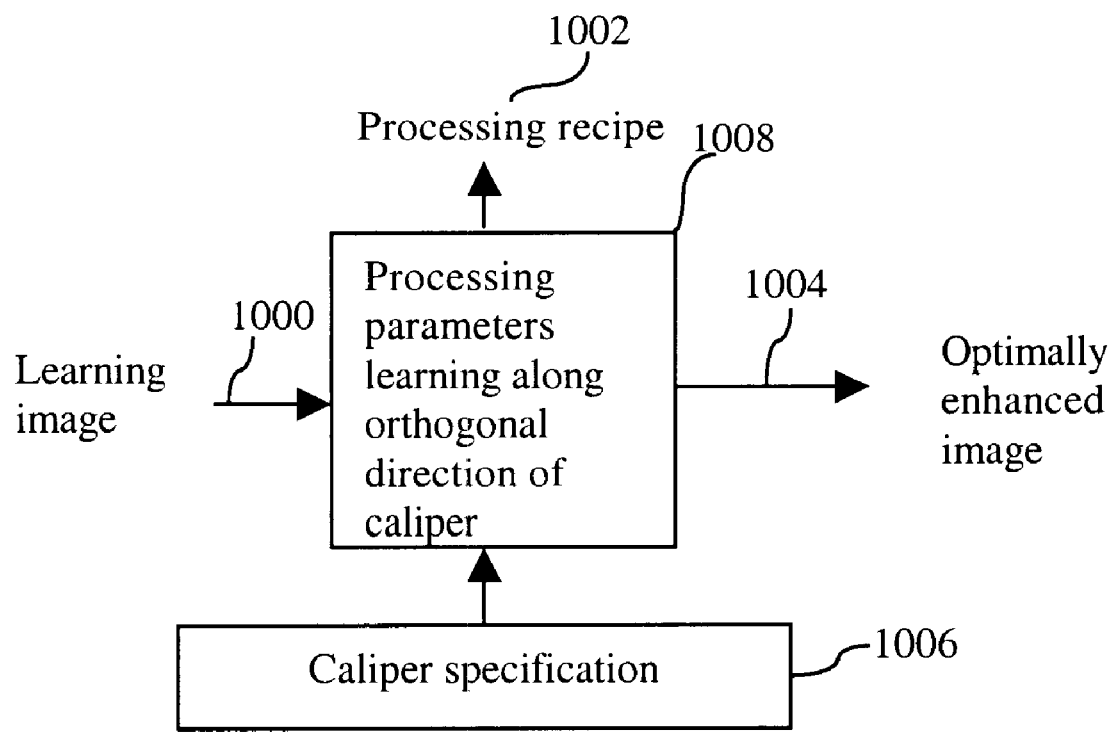
FIG. 10 shows a structure-guided learning process for line enhancement of one embodiment of this invention.

For line features, only the structure along the line direction has to be enhanced. The structure-guided learning processing flow for line enhancement in the preferred embodiment of this invention is shown in FIG. 10.

In this embodiment of the invention, the line enhancement processing sequence includes an enhancement process along the direction orthogonal to the direction of the caliper. This is the direction of the line structure. As shown in FIG. 10, the parameters for the enhancement process along the direction orthogonal to a caliper is automatically determined by the structure-guided learning process of this invention using a learning image 1000 and the caliper specification 1006. The resulting processing recipe 1002 is used for processing of new images of the same target object design.

IV.1.1 Bright Line Enhancement Learning

A bright line has higher intensity than its background. In one embodiment of the invention, bright line enhancement learning consists of the following:

Set the direction of the directional elongated structuring element as the direction orthogonal to the caliper, Orth_i;

Determine the width of the caliper region w;

Set the starting size of the structuring element as: Start_size =MAX(3,odd(w/30));

Set the increment size as: increment_size=Start_size−1;

Set the maximum search size as Max_size=w/2;

The learning process can be described by the following pseudo codes:

I=I_in;
EGM_max=0;
Orth_size=0;
For (S=Start_size; S+=increment_size; S<=Max_size)
{
    I=I ● orth_S ○ orth_S;
Determine the enhancement goodness measure: EGM(I);
If (EGM(I)>=EGM_max)
{
EGM_max=EGM(I);
Orth_size=S;
I_orth=I;
}
}
Set the ending size as: end_size=Orth_size;
The optimally enhanced image is I_orth;

Note that EGM_max is a temporary variable, orth_S designates a directional elongated structuring element along the orthogonal direction to the caliper direction with size S. Enhancement goodness measure is defined in section IV.2 Enhancement Goodness Measure.

Those skilled in the art should recognize that deviation from the above learning sequence can be made without impacting the scope of this invention. For example, a fuzzy factor can be included in the enhancement goodness measure to encourage the use of larger size structuring element if that is desired. In addition, the rules for determining Start_size, increment_size and Max_size can be adjusted to suit a given application. In addition, each opening and closing iteration could use an increased size structuring element within the same iteration for aggressive feature refinement.

After learning, the bright line enhancement application can be executed by the following steps:

Set the direction of the directional elongated structuring element as the direction orthogonal to the caliper, Orth_i;

Determine the width of the caliper region w;

Set the starting size of the structuring element as: Start_size=MAX(3,odd(w/30));

Set the increment size as: increment_size=Start_size−1;

The application process can be described by the following pseudo codes:

I=I_in;
For (S=Start_size; S+=increment_size; S<=end_size)
    I=I ● orth_S ○ orth_S;
I_out=I;

IV.1.2 Dark Line Enhancement Learning

A dark line has lower intensity than its background. The dark line enhancement learning in a preferred embodiment of the invention is very similar to the bright line learning described above. It starts with a morphological opening followed by a morphological closing to detect dark features. All other steps are the same as the bright line learning. The processing steps are:

Set the direction of the directional elongated structuring element as the direction orthogonal to the caliper, Orth_i;

Determine the width of the caliper region w;

Set the starting size of the structuring element as: Start_size=MAX(3,odd(w/30));

Set the increment size as: increment_size=Start_size−1;

Set the maximum search size as Max_size=w/2;

The learning process can be described by the following pseudo codes:

I=I_in;
EGM_max=0;
Orth_size=0;
For (S=Start_size; S+=increment_size; S<=Max_size)
{
　I=I ∘ orth_S ● orth_S;
　Determine enhancement goodness measure: EGM(I)
　{
　If (EGM(I)>=EGM_max)
　EGM_max=EGM(I);
　Orth_size=S;
　I_orth=I;
　}
}
Set the ending size as: end_size=Orth_size;
The optimally enhanced image is I_orth;

Those skilled in the art should recognize that deviation from the above learning sequence could be made without impacting the scope of this invention. For example, a fuzzy factor can be included in the enhancement goodness measure to encourage the use of larger size structuring element if that is desired. In addition, the rules for determining Start_size, increment_size and Max_size can be adjusted to suit a given application. In addition, each opening and closing iteration could use increased size structuring elements within the same iteration for aggressive feature refinement.

After learning, the bright line enhancement application can be executed by the following steps:

Set the direction of the directional elongated structuring element as the direction orthogonal to the caliper, Orth_i;

Determine the width of the caliper region w;

Set the starting size of the structuring element as: Start_size=MAX(3,odd(w/30));

Set the increment size as: increment_size=Start_size−1;

The application process can be described by the following pseudo codes:

I=I_in;
For (S=Start_size; S+=increment_size; S<=end_size)
　I=I ∘ orth_S ● orth_S;
I_out=I;

IV.2 Enhancement Goodness Measure

The enhancement goodness measure determines the goodness of the enhancement result. It measures the contrast of the enhanced features along the feature direction. In one embodiment of this invention, the contrast is determined by an edge of edge operation to generate a contrast image. It performs edge detection using the difference of morphological dilation and erosion (Lee, J S J, Haralick, R M and Shapiro, L G, "Morphologic Edge Detection," IEEE Trans. Robotics and Automation RA3(2):142–56, 1987). The enhancement goodness measure is derived from a projection of the edge of edge values along the feature direction and determines the maximum value for all projection profiles along the direction of the caliper. The processing sequence is specified as follows:

Determine the caliper direction Direc_i;

Determine the direction orthogonal to caliper direction Orth_i;

Perform directional contrast measurement (where ⊕ designates dilation and ⊖ designates erosion)
　I_edge=I⊕ direc_5−I⊖ direc_5
　I_edge$^2$=I_edge ⊕ direc_5−I_edge ⊖ direc_5

Perform projection in orthogonal direction within the caliper region
　Profile=Project_orth(I_edge$^2$)

Enhancement goodness measure=MAX(Profile)

Where Profile is an array of size L containing projection values along the orthogonal lines of a caliper. Those skilled in the art should recognize that other types of enhancement goodness measure could be used in this invention to measure the enhancement results. For example, other statistics of the projection profiles such as average, median, top 95th percentile value, ratio between the maximum and second maximum values, ratio between the second maximum and the third maximum values, etc. could be used for the enhancement goodness measure.

IV.3 Edge Enhancement Learning

To enhance an edge, the regions separated by the edge have to be enhanced. To enhance regions, two-dimensional processing is used in a preferred embodiment of the invention. The structure-guided learning processing flow for edge enhancement in one embodiment of this invention is shown in FIG. 11.

Figure 11:
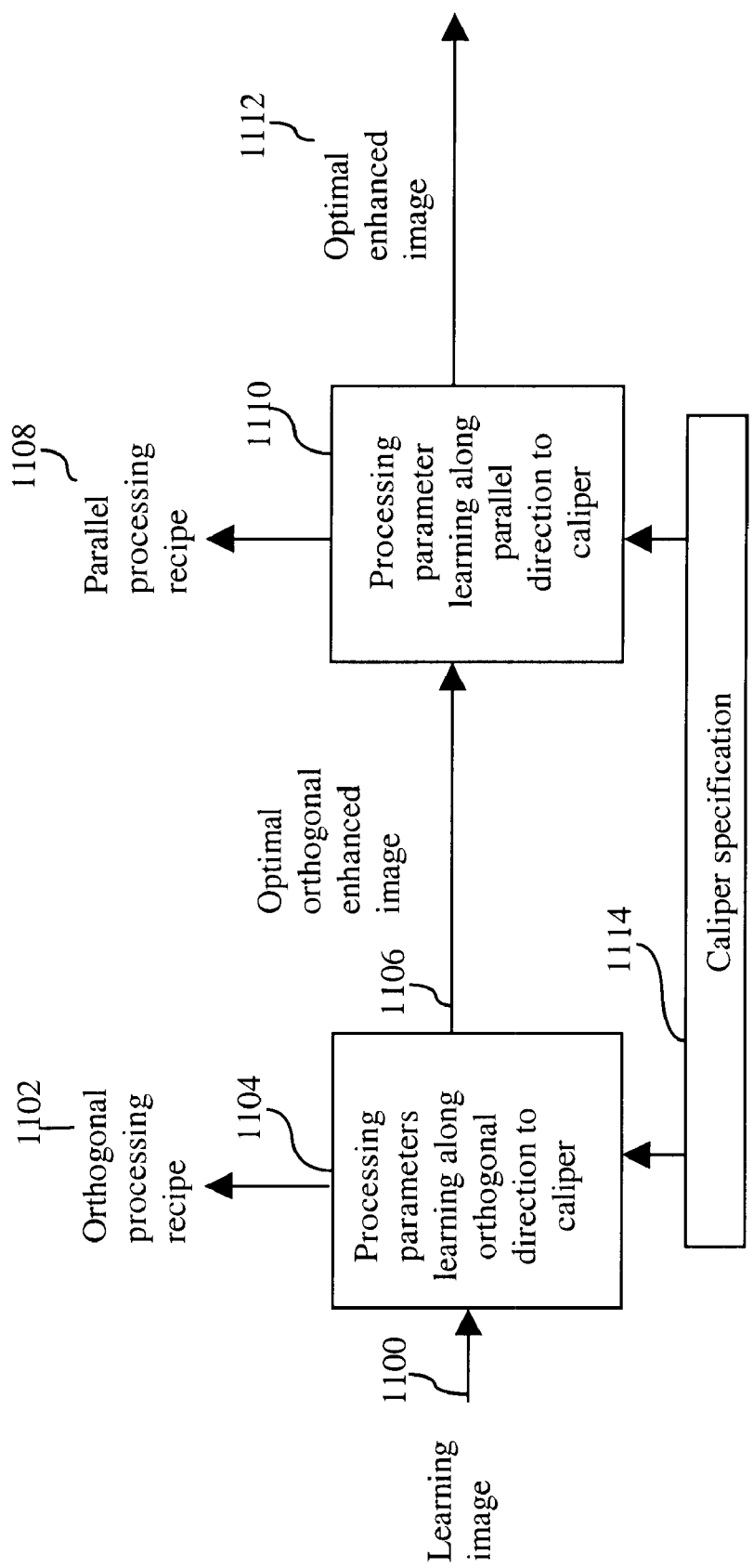
FIG. 11 shows the processing flow for one embodiment of the structure-guided learning for edge enhancement.

As shown in FIG. 11, the edge enhancement processing sequence includes two steps: an enhancement process along the direction orthogonal to the direction of the caliper 1104 and an enhancement process along the direction parallel to the direction of the caliper 1110. The structure of the features and their scale of interest are determined by the orthogonal and parallel directions and sizes of the caliper 1114. The parameters for the enhancement process along the orthogonal direction of caliper (direction of feature structure) are automatically determined by the structure-guided learning process of this invention 1104, 1110 using a learning image 1100 and the caliper specification. The resulting orthogonal enhanced image 1106 is the input to the second stage 1110 that automatically determines the parameters for the enhancement process along the parallel direction of the caliper 1110. The resulting orthogonal processing recipe 1102 and parallel processing recipe 1108 are used for the processing of new images of the same target object design.

IV.3.1 Enhance Bright Regions

In one embodiment of the invention, the edge enhancement learning that enhances bright regions consists of the following steps:

Set the direction of the directional elongated structuring element as the direction orthogonal to the caliper, Orth_i;

Determine the width of the caliper region w;

Set the starting size of the structuring element as: Start_size=MAX(3,odd(w/30));
Set the increment size as: increment_size=Start_size−1;
Set the maximum search size as Max_size=w/2;
The learning process can be described by the following pseudo codes:
I=I_in;
EGM_max=0;
Orth_size=0;
For (S=Start_size; S+=increment_size; S<=Max_size)
{
I=I ● orth_S ○ orth_S;
Determine enhancement goodness measure: EGM(I);
If (EGM(I)>=EGM_max)
{
EGM_max=EGM(I);
Orth_size=S;
I_orth=I;
}
}
Set the orthogonal ending size as: orth_end_size=Orth_size;
Set the direction of the directional elongated structuring element as the direction of the caliper, Direc_i;
Determine the length of the caliper region L;
Set the starting size of the structuring element as: Start_size=MAX(3,odd(L/40));
Set the increment size as: increment_size=Start_size−1;
Set the maximum search size as Max_size=L/4;
The learning process can be described by the following pseudo codes:
I=I_orth;
EGM_max=0;
Direc_size=0;
For (S=Start_size; S+=increment_size; S<=Max_size)
{
I=I ● Direc_S ○ Direc_S;
Determine enhancement goodness measure: EGM(I)
If (EGM(I)>=EGM_max)
{
EGM_max=EGM(I);
Direc_size=S;
I_out=I;
}
}
Set the direction ending size as: Direc_end_size=Direc_size;
The final enhancement goodness measure EGM_bright=EGM_max;

Those skilled in the art should recognize that deviation from the above learning sequence can be made without impacting the scope of the invention. For example, a fuzzy factor can be included in the edge goodness measure to encourage the use of larger size structuring element if that is desired. In addition, the rules for determining Start_size, increment_size and Max_size can be adjusted to suit a given application. Furthermore, the optimization of the parallel direction can be conducted before the optimization of the orthogonal direction. In addition, each opening and closing iteration could use an increasing size structuring element within one iteration for aggressive feature refinement. Moreover, the elongated structuring element in the orthogonal direction and parallel direction could be alternatively applied in the enhancement processing sequence. This can better preserve the two dimensional shape of the features. The methods of the invention can all be applied in the learning process and the ones with the highest enhancement goodness measure are used as the learned method.

After learning, the bright region enhanced edge enhancement application can be executed by the following steps:
Set the direction of the directional elongated structuring element as the direction orthogonal to the caliper, Orth_i;
Determine the width of the caliper region w;
Set the starting size of the structuring element as: Start_size=MAX(3,odd(w/30));
Set the increment size as: increment_size=Start_size−1;
The orthogonal enhancement application process can be described by the following pseudo codes:
I=I_in;
For (S=Start_size; S+=increment size; S<=orth_end_size)
I=I ● orth_S ○ orth_S;
Set the direction of the directional elongated structuring element as the direction of the caliper, Direc_i;
Determine the length of the caliper region L;
Set the starting size of the structuring element as: Start_size=MAX(3,odd(L/40));
Set the increment size as: increment_size=Start_size−1
The parallel enhancement application process is described in the following pseudo codes:
For (S=Start_size; S+=increment_size; S<=Direc_end_size)
I=I ● Direc_S ○ Direc_S;
I_out=I;

IV.3.2 Enhance Dark Regions

In one embodiment of the invention, the edge enhancement learning that enhances dark regions consists of the following steps:
Set the direction of the directional elongated structuring element as the direction orthogonal to the caliper, Orth_i;
Determine the width of the caliper region w;
Set the starting size of the structuring element as: Start_size=MAX(3,odd(w/30));
Set the increment size as: increment_size=Start_size−1;
Set the maximum search size as Max_size=w/2;
The learning process can be described by the following pseudo codes:
I=I_in;
EGM_max=0;
Orth_size=0;
For (S=Start_size; S+=increment_size; S<=Max_size)
{
I=I ○ orth_S ● orth_S;
Determine Enhancement goodness measure: EGM(I);
If (EGM(I)>=EGM_max)
{
EGM_max=EGM(I);

Orth_size=S;
I_orth=I;
}
}
Set the orthogonal ending size as: orth_end_size=Orth_size;

Set the direction of the directional elongated structuring element as the direction of the caliper, Direc_i;

Determine the length of the caliper region L; Set the starting size of the structuring element as: Start_size=MAX(3,odd(L/40));

Set the increment size as: increment_size=Start_size−1;

Set the maximum search size as Max_size=L/4;

The learning process can be described by the following pseudo codes:

I=I_orth;
EGM_max=0;
Direc_size=0;
For (S=Start_size; S+=increment_size; S<=Max_size)
{
I=I ○ Direc_S ● Direc_S;
Determine Enhancement goodness measure: EGM(I);
If (EGM(I)>=EGM_max)
{
EGM_max=EGM(I);
Direc_size=S;
I_out=I;
}
}
Set the direction ending size as: Direc_end_size=Direc_size;

The final enhancement goodness measure EGM_dark=EGM_max;

Those skilled in the art should recognize that deviation from the above learning sequence can be made without impacting the scope of the invention. For example, a fuzzy factor can be included in the edge goodness measure to encourage the use of larger size structuring element if that is desired. In addition, the rules for determining Start_size, increment_size and Max_size can be adjusted to suit a given application. Furthermore, the optimization of processing in the parallel direction can be conducted before the optimization of processing in the orthogonal direction. In addition, each opening and closing iteration could use increasing size structuring element within one iteration for aggressive feature refinement. Moreover, elongated structuring element of orthogonal direction and parallel direction could be alternatively applied in the enhancement processing sequence. This can better preserve the two dimensional shape of the features. The above mentioned methods can all be applied in the learning process and the ones with the highest enhancement goodness measure is used as the learned method.

After learning, the dark region enhanced edge enhancement application can be executed by the following steps:

Set the direction of the directional elongated structuring element as the direction orthogonal to the caliper, Orth_i;

Determine the width of the caliper region w;

Set the starting size of the structuring element as: Start_size=MAX(3,odd(w/30));

Set the increment size as: increment_size=Start_size−1;

The orthogonal enhancement application process can be described by the following pseudo codes:

I=I_in;
For (S=Start_size; S+=increment_size; S<=orth_end_size)
I=I ○ orth_S ● orth_S;
Set the direction of the directional elongated structuring element as the direction of the caliper, Direc_i
Determine the length of the caliper region L;
Set the starting size of the structuring element as: Start_size=MAX(3,odd(L/40));
Set the increment size as: increment_size=Start_size−1;
The parallel enhancement application process can be described by the following pseudo codes:
For (S=Start_size; S+=increment_size; S<=Direc_end_size)
I=I ○ Direc_S ● Direc_S;
I_out=I;

IV.3.3 General Region Enhancement

As described in the previous sections, edge enhancement has two alternative methods: one enhances bright regions adjacent to the edges, the other enhances dark regions adjacent to the edges. The selection of the appropriate method can be based on the application specific information or can be automatically learned. To automatically learn the right method, the final enhancement goodness measure for bright region enhancement EGM_bright derived from learning and the final enhancement goodness measure for dark region enhancement EGM_dark derived from learning are compared. If EGM_bright is greater than or equal to EGM_dark, the bright region enhancement method described in section IV.3.1 Enhance Bright Regions is used. Otherwise, the dark region enhancement method described in section IV.3.2 Enhance Dark Regions is used.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A caliper based structure-guided processing system comprising:
    (a) Means to receive an image input;
    (b) Means to receive a non-directional box caliper input;
    (c) means to convert said non-directional box caliper input to a directional box caliper output;
    (d) means to use the directional box caliper to perform structure-guided processing on the image input to produce a structure-guided processing output.

2. The caliper based structure-guided processing system of claim 1 wherein the non-directional box caliper is a circle caliper.

3. The caliper based structure-guided processing system of claim 1 wherein the non-directional box caliper is an arc caliper.

4. The caliper based structure-guided processing system of claim 2 further comprises a means to inverse convert the structure-guided processing output to the original image format defined by a circle caliper.

5. The caliper based structure-guided processing system of claim 3 further comprises a means to inverse convert the structure-guided processing output to the original image format defined by an arc caliper.

6. A structure-guided edge enhancement learning system comprising:
   (a) a learning image input;
   (b) an application domain structure and detection target specification input;
   (c) edge enhancement processing parameter learning along the direction of edge structure having a first processing recipe output;
   (d) edge enhancement processing parameter learning along the direction orthogonal to the edge structure having a second processing recipe output.

7. The structure-guided edge enhancement learning system of claim 6 further comprising the step of having an enhancement goodness measure output.

8. The system of claim 6 wherein the application domain structure and detection target are specified using a caliper method.

9. The system of claim 6 wherein the edge enhancement processing is an increasing idempotent processing sequence of morphological opening and closing operations.

10. The system of claim 9 wherein the morphological opening and closing operations include a directional elongated structuring element.

11. The system of claim 6 wherein the processing parameter is selected from the group consisting of the starting size of the structuring element, the increment size of the structuring element for each iteration, and the ending size of the structuring element.

12. The system of claim 7 wherein the processing parameter learning determines the structuring element size having the highest enhancement goodness measure.

13. The system of claim 7 wherein the enhancement goodness measure comprises
   (a) a directional contrast measurement with a contrast image output;
   (b) projection of contrast image in orthogonal direction within the caliper region to generate projection profiles;
   (c) output statistics of the profile as the enhancement goodness measure.

14. The system of claim 12 wherein the output statistics is a maximum value.

15. The system of claim 6 further comprises an edge enhancement application module that enhances the edges of the image input using the processing recipes.

16. The system of claim 7 further comprises a general region enhancement learning process comprising:
   (a) determine the bright enhancement goodness measure by bright edge enhancement learning;
   (b) determine the dark enhancement goodness measure by dark edge enhancement learning;
   (c) select bright edge enhancement process if the bright enhancement goodness measure is larger than or equal to the dark enhancement goodness measure;
   (d) select dark edge enhancement process if the dark enhancement goodness measure is larger than the bright enhancement goodness measure.

17. A structure-guided automatic learning system for image feature enhancement comprising:
   (a) means to receive a learning image input;
   (b) means to receive an application domain structure and detection target specification input that are specified using a caliper method selected from the set consisting of a directional box caliper, a circle caliper, and an arc caliper;
   (c) a structure-guided feature enhancement learning module processes the learning image using the structure and detection target specification having a feature enhancement processing recipe output.

18. A structure-guided contrast extraction system comprising:
   (a) means to receive an input image;
   (b) means to receive an application domain structure and detection target specification input that are specified using a caliper method;
   (c) a structure-guided contrast extraction module processes the input image using the structure and target detection specification having a contrast extracted image output, wherein the structure-guided contrast extraction module further comprises:
      i. means for closing of the input image by a structuring element determined by a caliper input;
      ii. means for opening of the input image by a structuring element determined by a caliper input;
      iii. means to output the difference between the closing result and the opening result.

19. A structure-guided line enhancement learning system comprising:
   (a) a learning image input;
   (b) an application domain structure and detection target specification input;
   (c) line enhancement processing parameter learning along the direction determined by the application domain structure and detection target specification input having a processing recipe output, wherein the line enhancement process is an increasing idempotent processing sequence of morphological opening and closing operations.

20. The system of claim 19 wherein the morphological opening and closing operations include a directional elongated structuring element.

21. A structure-guided line enhancement learning system comprising:
   (a) a learning image input;
   (b) an application domain structure and detection target specification input;
   (c) line enhancement processing parameter learning along the direction determined by the application domain structure and detection target specification input having a processing recipe output, wherein said processing parameter is selected from the group consisting of starting size of the structuring element, the increment size of the structuring element for each iteration, and the ending size of the structuring element.

22. A structure-guided line enhancement learning system comprising:
   (a) a learning image input;
   (b) an application domain structure and detection target specification input;
   (c) line enhancement processing parameter learning along the direction determined by the application domain structure and detection target specification input having a processing recipe output and an enhancement goodness measure output, wherein the processing parameter learning determines the structuring element size having the highest enhancement goodness measure.

23. The system of claim 22 wherein the enhancement goodness measure comprises
   (a) a directional contrast measurement with a contrast image output;
   (b) projection of contrast image in orthogonal direction within the caliper region to generate projection profiles;
   (c) output statistics for the profile as the enhancement goodness measure.

24. The system of claim 23 wherein the statistics is the maximum value of the enhancement goodness measure.

* * * * *